United States Patent Office 3,376,108
Patented Apr. 2, 1968

3,376,108
OXYGEN-CATALYZED PRODUCTION OF
TETRAFLUOROHYDRAZINE
John R. Lovett, Edison, and Theodore M. Rosenblatt, Plainfield, N.J., assignors to Esso Research and Engineering Company, a corporation of Delaware
No Drawing. Filed Oct. 6, 1960, Ser. No. 61,028
2 Claims. (Cl. 23—205)

This invention relates to the production of tetrafluorohydrazine. More particularly, this invention relates to a process of producing tetrafluorohydrazine in which oxygen is used to activate the catalyst. Specifically, this invention relates to a process of producing tetrafluorohydrazine from nitrogen trifluoride wherein oxygen or oxygen-containing compounds, e.g. nitrogen oxides, are used to activate a copper catalyst.

Tetrafluorohydrazine is well known in the field of rocket propellants as a high energy oxidizer, as a reactant used to make organic and inorganic propellant compositions containing difluoroamine groups, and as a fluorinating agent. When used as a reactant in synthesis of solid or liquid fluorine oxidizers and because of the nature of the reactions involved in the synthesis of some of these compounds, it is essential that the tetrafluorohydrazine has a high degree of purity.

There are several known processes for producing tetrafluorohydrazine, but they all possess certain undesirable features. Tetrafluorohydrazine has been prepared by contacting nitrogen trifluoride with various fluorine acceptors (represented by M, wherein $n$ is the valence of M), such as carbon, mercury, and copper in accordance with the following reaction.

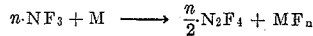

$$n \cdot NF_3 + M \longrightarrow \frac{n}{2} N_2F_4 + MF_n$$

The carbon process which is currently being used commercially has the problem of separating the tetrafluorohydrazine product from the close boiling perfluorocarbon by-products and the unreacted nitrogen trifluoride. Thus, far, products of greater than 90 mole percent purity have not been obtained by this process.

In the process where mercury is used as the fluorine acceptor, the reaction is carried out at about 1100° F. This process has certain drawbacks, one of which is the extreme toxicity of mercury vapors.

Tetrafluorohydrazine has also been produced by passing nitrogen trifluoride in an inert gas carrier over a copper catalyst at temperatures of 700° F. to 1100° F. This process, however, has the following shortcomings. The results are often nonreproducible; an induction time (i.e. the time that is required to run nitrogen trifluoride over fresh copper catalyst before any appreciable amount is converted to tetrafluorohydrazine) of 4 to 16 hours has been required; and the percent of nitrogen trifluoride converted to tetrafluorohydrazine has been relatively low.

An object of this invention is to prepare high yields of high purity tetrafluorohydrazine. Another object of this invention is to substantially reduce the induction time. Still another object of the invention is to reduce the residence time required to obtain economical conversions.

It has now been unexpectedly found that adding oxygen to the $NF_3$ feed in the form of oxygen, air or combined with nitrogen increases the product yield up to about 70%, which product can be purified to 99+% and substantially reduces the induction time. It is believed that oxygen put into the reactor with the $NF_3$ feed is converted to NO and $N_2O$. The nitrogen oxides are believed to be the activating agents. This invention, however, is not to be restricted to any particular theory of operation. Very small amounts of oxygen have essentially no effect on the reaction and large amounts of oxygen cause substantially complete decomposition of the tetrafluorohydrazine to $N_2$ and nitrogen oxides. The amount of oxygen present in the feed should be maintained at about 0.5% to 5.0% by weight based on the $NF_3$ feed. These percentages, however, will vary with the reaction conditions and the state of the catalyst. The reaction is preferably carried out by putting controlled amounts of nitrogen oxides directly into the $NF_3$ feed, rather than by putting oxygen into the feed which, it is believed, subsequently forms the nitrogen oxides.

A gas comprising a controlled amount of oxygen sufficient to substantially increase the yield of tetrafluorohydrazine yet not sufficient to decompose an appreciable amount of the tetrafluorohydrazine product is charged to a reactor containing a copper catalyst together with $NF_3$ and an inert gas diluent. The reaction is carried out at a temperature of 600° to 1500° F., and at pressures of about 5 p.s.i.a. to 200 p.s.i.a. The residence time is from 1–15 minutes, and the reaction starts in less than 30 minutes after the $NF_3$ is charged to the reactor. The reaction products which consist of tetrafluorohydrazine, nitrogen oxides, and unreacted $NF_3$, are condensed in a cold trap maintained at a temperature sufficiently low to condense all of the effluent gases. Essentially all of the nitrogen oxides are flashed off along with a substantial amount of $NF_3$. The remainder of the nitrogen oxides and $NF_3$ is separated from the tetrafluorohydrazine by conventional low temperature pod distillation. Tetrafluorohydrazine of 99+% purity is obtained. The unreacted $NF_3$ is recycled.

The $NF_3$ feed is available commercially and analysis shows that it contains from 0% up to 0.5% by weight of nitrogen oxides based on the total $NF_3$ feed. When the nitrogen oxides, instead of oxygen, are added to the $NF_3$ feed, the total amount of nitrogen oxides present is adjusted so that there is about 1% to 6% by weight of nitrogen oxides present based on the $NF_3$ feed. Though concentrations of nitrogen oxides of 1.5 to 3.5% by weight are preferred, concentrations of 2–4% by weight can also be used.

The $NF_3$ feed can contain various amounts of inert diluent gases such as helium, argon, etc. The presence of the diluent is not critical and only has a diluting function.

The copper catalyst can be in the form of a wire mesh, granules, pellets, copper turnings, etc. The physical size of the catalyst is not critical within wide limits as long as there is sufficient reactive surface to carry out the reaction and as long as the copper particles are of sufficient mass not to be too rapidly used up. Commercially available copper cleaning pads or copper turnings of about 10 mils by 30 mils and of varying thickness can be used. The catalyst can be fresh or one that has previously been used in this reaction.

The reaction can be carried out at temperatures of 600° to 1500° F., and preferably 750° to 1250° F. The flow rate of the $NF_3$ feed is not critical and will depend on whether or not it has been diluted with an inert gas, temperature, pressure and size of the reactor and amount of catalyst. Generally a flow rate of 150 cc. to 200 cc. per minute (STP) and atmospheric pressure is used, which is equivalent to a residence time of 2–4 minutes. (Residence time is defined by the volume of the reactor divided by the flow rate of the reactant, e.g. vol. reactor in cc./flow rate at reactor temperature cc. per minute.) The pressure at which the reaction is carried out is not particularly critical, and the reaction can be carried out at pressures of 5 p.s.i.a. to 200 p.s.i.a., preferably 15 p.s.i.a. to 100 p.s.i.a. Generally, the reaction for economic reasons is carried out at about atmospheric pressure, i.e. 15 p.s.i.a. At higher pressures, however, residence time and temperature must be adjusted to maintain selectivity and catalyst life.

The reactor is made of a material that is not attacked by the reactants and is capable of withstanding temperatures up to 2000° F. A stainless steel reactor provided with a heating jacket is used.

In a preferred embodiment of the invention a stainless steel reactor is packed with a fresh copper wire mesh catalyst which has been degreased. The reactor is heated to a temperature of 900° to 1200° F. and a nitrogen trifluoride gas containing 1 to 6% by weight of nitrogen oxides is contacted with the copper catalyst at atmospheric pressure at a rate of 150 to 200 cc. per minute. The residence time is about 2 to 4 minutes. Tetrafluorohydrazine is formed within a few, e.g. 10–30 minutes after the nitrogen trifluoride is initially fed to the reactor. The reaction product mixture comprising tetrafluorohydrazine, nitrogen oxides, and unreacted $NF_3$ are condensed in a cold trap containing liquid nitrogen. The nitrogen oxides are flashed off with a portion of the $NF_3$. The remainder of the $NF_3$ is separated by conventional low temperature pod distillation. Tetrafluorohydrazine of 99+% purity is obtained.

The invention is illustrated by the following example.

EXAMPLE I

A 1.5 liter reactor is packed full with about 700 grams of pure copper wire pads which have been solvent degreased and dried with $N_2$. The reactor and connecting lines are flushed with helium, then the reactor is brought up to operating temperature of about 1000° F. while maintaining a helium flow of about 50 cc. per minute. While the reactor is being brought to operating temperature, two 100 cc. cold traps which are connected to the reactor and are in series are cooled with liquid nitrogen. The source of $NF_3$ is turned on and $NF_3$ is gradually fed to the reactor until a flow rate of 150 cc. per minute is reached. As the flow rate of $NF_3$ is increased, the flow of helium is reduced to 10 cc./min. Nitrogen oxides are then introduced into the $NF_3$ feed bringing the total concentration of NO to 3.1 wt. percent and the $N_2O$ to 0.8 wt. percent based on the total $NF_3$ feed. After about ½-hour onstream the product gases are analyzed and found to contain 12.7 wt. percent of $N_2F_4$. The product is collected in the cold traps and ½ to ¾ of the total condensate is flashed off concentrating the $N_2F_4$ to about 40 wt. percent of the remaining liquid. The distillate contains most of the nitrogen oxides and some of the $NF_3$. The concentrated $N_2F_4$ is distilled by conventional pod distillation to remove the remaining $NF_3$. The residue is $N_2F_4$ of 99+% purity. The unreacted $NF_3$ is recycled to the reactor.

Additional runs were made using the procedure of Example I, with the exceptions that (1) varying amounts of nitrogen oxide and nitrous oxide were used in the feed, (2) the reaction was carried out at different temperatures, and (3) with copper catalysts that varied in total onstream time. Each of the runs was carried out with an $NF_3$ feed containing up to 0.5% nitrogen oxides as a control. As previously stated, the commercially available $NF_3$ contained up to 0.5% nitrogen oxides. The data obtained from these runs have been tabulated below in Table I.

TABLE I

| Run | Wt. Percent in Feed Based on Feed [1] | | Wt. Percent in Control Based on Feed | | Total Hours Cat. on Stream | Temp., °F. | Wt. Percent in Product Based on Product Mixture $N_2F_4$ |
|---|---|---|---|---|---|---|---|
| | NO | $N_2O$ | NO | $N_2O$ | | | |
| 1 | 3.2 | 0.7 | | | 11 | 1,030 | 13.0 |
| | | | 0.5 | | 11 | 1,020 | 7.0 |
| | | | 0.2 | 0.2 | 11 | 1,040 | 7.5 |
| 2 | 1.7 | 0.7 | | | 16 | 1,110 | 22.0 |
| | 0.8 | 1.7 | | | 16 | 1,110 | 20.0 |
| | | | 0.2 | 0.2 | 16 | 1,110 | 12.5 |
| 3 | 1.2 | 1.3 | | | 20 | 1,120 | 14.4 |
| | 1.5 | 0.8 | | | 20 | 1,120 | 14.9 |
| | | | 0.2 | 0.2 | 20 | 1,120 | 8.4 |
| 4 | 1.2 | 0.4 | | | 13 | 920 | 4.5 |
| | | | 0.2 | 0.2 | 13 | 920 | 2.7 |
| 5 | 4.6 | 0.3 | | | 23 | 1,045 | 16.2 |
| | | | 0.2 | 0.2 | 23 | 1,045 | 9.5 |
| 6 | 8.0 | 1.6 | | | 21 | 1,050 | 19 |
| | | | 0.2 | 0.2 | 21 | 1,050 | 10 |

[1] The feed and products were analyzed while the reactor was in operation by using a standard gas chromatographic column.

The effect of nitrogen oxides on reducing the induction time with fresh catalyst is given in Table II below.

TABLE II

| Run | Wt. Percent Nitrogen Oxides Based on Feed | Fresh Cat., Hrs. on Stream | Wt. Percent $N_2F_4$ in Product | Temp., °F. |
|---|---|---|---|---|
| 1 [1] | 0.4 | 3½ | <5 | 850 |
| 2 | 0.4 | 2½ | <5 | 800 |
| 3 | 2 to 4 | 1 | 18 | 800 |
| 4 | 2 to 4 | 1 | 10 | 720 |
| 5 | 2 to 4 | 2 | 12 | 800 |

[1] Runs 1 and 2 represent the control feed which was the commercially available $NF_3$.

From the foregoing tables it is obvious that using an $NF_3$ feed containing 1 to 6% by weight of nitrogen oxides results in an unexpected improvement in yield of tetrafluorohydrazine, reduction of induction time, and a product of high purity. It is also noted that the residence time is shortened.

The invention is not intended to be limited by the above examples but only by the scope of the appended claims.

What is claimed is:

1. In the process of converting $NF_3$ to tetrafluorohydrazine, $N_2F_4$, by reacting $NF_3$ in a flowing gas stream with copper in a reaction zone at a reaction temperature in the range of 600° to 1500° F., the improvement which comprises admixing with the $NF_3$ gas stream containing less than 0.5 wt. percent of the nitrogen oxides NO and $N_2O$ based on the $NF_3$ feed charged to the reaction zone, a proportion of oxygen-containing gas of the group consisting of $O_2$, NO, and $N_2O$ to make said $NF_3$ gas stream contain 1 to 6 wt. percent of the nitrogen oxides NO and $N_2O$ as said gas stream is contacted in the reaction zone with the copper to reduce the induction time for conversion of the $NF_3$ to $N_2F_4$ by reaction with fresh copper in said reaction zone and to activate the used copper in the reaction zone so that higher conversion to $N_2F_4$ is maintained, and recovering the resulting $N_2F_4$ product by separation from the effluent gaseous reaction product mixture flowing from the reaction zone.

2. In the process as defined in claim 1 the oxygen-containing gas admixed with the $NF_3$ gas stream containing less than 0.5 wt. percent being the nitrogen oxides NO and $N_2O$ in a proportion to make the $NF_3$ gas stream reacted in the reaction zone with the copper contain 1.5 to 3.5 wt. percent of the nitrogen oxides NO and $N_2O$ based on the $NF_3$ in the feed charged to the reaction zone.

(References on following page)

References Cited

Colburn, "J. Am. Chem. Soc.," 80, 5004 (1958).
Simons, "Fluorine Chemistry," vol. I, pp. 86–88, Academic Press (1950).
Ruff, "Z. Anorg. Allgem. Chem.," 196, pp. 421–428 (1931).
Ruff, "Z. Anorg. Allgem. Chem.," 197, pp. 273–286 (1931).

MILTON WEISSMAN, *Primary Examiner.*

ROGER L. CAMPBELL, *Examiner.*

R. D. MORRIS, *Assistant Examiner.*